United States Patent Office 3,778,477
Patented Dec. 11, 1973

3,778,477
MANUFACTURE OF α,β-UNSATURATED
CARBONYL COMPOUNDS
Herbert Mueller, Frankenthal, and Norbert Goetz, Bobenheim-Roxheim, Germany, assignors to Badische Anilin- & Soda-Fabrik Aktiengesellschaft, Ludwigshafen (Rhine), Germany
No Drawing. Filed Apr. 21, 1971, Ser. No. 136,212
Int. Cl. C07c 45/00
U.S. Cl. 260—599
12 Claims

ABSTRACT OF THE DISCLOSURE

A process for the manufacture of α,β-unsaturated carbonyl compounds by contacting the corresponding β,γ-unsaturated alcohols with a dehydrogenation catalyst at temperatures ranging from 150° to 600° C. The reaction proceeds particularly well when carried out in the presence of catalytic amounts of certain nucleophilic substances.

---

It is known from U.S. Pats. 2,011,317 and 2,042,220 that one can manufacture α,β-unsaturated carbonyl compounds by dehydrogenating alcohols wherein the alcohols used as starting compounds already have the double bond in the α,β-position, however, some of these α,β-unsaturated alcohols are unfortunately very difficult to obtain.

It is an object of the invention to provide a process which enables α,β-unsaturated carbonyl compounds to be produced from more readily available starting materials in a simple manner and in good yields.

We have found that not only alcohols already containing the double bond in the desired α,β-position may be dehydrogenated to the corresponding α,β-unsaturated carbonyl compounds but also that α,β-unsaturated carbonyl compounds may be obtained in an advantageous manner by contacting the corresponding β,γ-unsaturated alcohols with dehydrogenation catalysts at temperatures of from 150° to 600° C. Surprisingly, the reaction proceeds quite smoothly and gives high yields. The reaction proceeds particularly well when carried out in the presence of aliphatic or aromatic organic compounds containing nitrogen, phosphorus or sulfur and having nucleophilic properties or in the presence of ammonia.

The reaction of the invention may be represented by the following scheme:

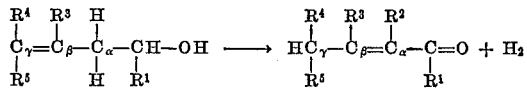

In both formulae the symbols $R^1$ to $R^5$ represent hydrogen atoms or hydrocarbon radicals. Preferred radicals $R^1$ to $R^3$ are, in addition to hydrogen, alkyl groups of from 1 to 6 carbon atoms, cycloalkyl of from 4 to 6 ring members and the phenyl group. In particular, $R^1$ to $R^3$ stand for hydrogen, methyl, ethyl or phenyl. The symbols $R^4$ and $R^5$ preferably stand for hydrogen or alkyl of from 1 to 3 carbon atoms, particularly hydrogen, methyl or ethyl.

Thus suitable alcohols for the process of the invention are, for example, 3-buten-1-ol, 3-penten-1-ol, 2-methyl-1-buten-4-ol, 1-penten-4-ol, 3-methyl-1-buten-4-ol, 3-hexen-1-ol, 3-methyl-3-penten-1-ol, 3-ethyl-3-buten-1-ol, 2-methyl-2-hexen-5-ol, 2-methyl-1-hexen-4-ol, 2-phenyl 1-buten-4-ol, 4-methyl-3-penten-1-ol and 2-cyclohexyl-1-buten-4-ol, especially 3-buten-1-ol and 2-methyl-1-buten-4-ol. Many of these alcohols have recently been made readily available by the reaction of olefins with aldehydes at elevated temperatures, as described in German Pat. 1,275,049.

Any mixtures of the isomeric α,β- and β,γ-unsaturated alcohols may also be converted to the corresponding α,β-unsatuated carbonyl compounds without previous separation.

Suitable dehydrogenation catalysts are the usual metals, alloys and metal compounds, in particular some of the metal oxides of Group b and Group VIII elements, specific examples being Cu, Ag, Se, Ni, Co, Mn, Cr, Pt, Pd, Zn, Cd, brass, Zn/Fe alloys, Zn/Ag alloys and CuO, ZnO, CdO and MnO. The catalysts may be used alone or in the form of mixed catalysts, and may or may not be supported on, for example, $Al_2O_3$ or activated charcoal. Examples of particularly suitable catalysts are CdO, MnO and, in particular, ZnO and mixed catalysts containing the metals Cu, Ag and/or Zn and metal oxides of the Group b elements such as ZnO, CdO or MnO.

In general, the catalyst is used in the form of pellets having a diameter of preferably 4–5 mm., in the form of extrusions having a length of 4–5 mm., or in the form of a powder.

The process of the invention is carried out by passing the unsaturated alcohol in the vapor phase over a catalyst bed. The conditions under which the process is carried out must be adjusted to suit the sensitivity of the substances to be dehydrogenated. The contact time and the reaction temperature are correlated so that no decomposition of the product occurs. The optimum conditions for each case may be readily determined by simple experiment. Very good results are obtained when the alcohol is passed over a fluidized catalyst bed.

In general, the process is carried out at temperatures ranging from 150° to 600° C., in particular from 200° to 500° C. The contact are generally in the range 0.06 to 60 seconds and preferably 0.2 to 1 second.

If desired, inert gases such as carbon dioxide, nitrogen, argon or volatile hydrocarbons may be added, and the process is carried out at ambient pressure or in a partial vacuum of from 10 to 500 mm. of Hg, advantageously from 20 to 200 mm. and preferably from 100 to 150 mm. of Hg. It is particularly advantageous, in many cases, to add from 20 to 50% by volume of steam and, if appropriate precautions are taken, to add up to 50% by volume of air during dehydrogenation.

Isolation of the desired products from the reaction mixture is effected by known and conventional techniques, for example by fractional distillation.

The process may be carried out in a particularly advantageous manner by effecting the reaction in the presence of catalytic amounts of certain nucleophilic substances. Suitable nucleophilic substances, which may be passed with the alcohol over the catalyst, are, in addition to ammonia, both aliphatic and aromatic organic compounds containing nitrogen phosphorus or sulfur. Examples of organic nitrogen compounds are primary, secondary and tertiary amines. For economical reasons, amines of up to 6 carbon atoms, preferably of up to 3 carbon atoms, are used. Particularly suitable amines are ethylamine, dimethylamine, trimethylamine, aniline and preferably, methylamine. Examples of nucelophilic phosphorus compounds are alkylphosphines in which the alkyl moiety has up to 4 and preferably 1 to 2 carbon atoms, for example trimethylphosphine and triethylphosphine, and also arylphosphines, for example triphenylphosphine. Suitable nucleophilic sulfur compounds are mercaptans of up to 5 and preferably of up to 3 carbon atoms, such as ethyl mercaptan and propyl mercaptan, and also thioethers of up to 6 carbon atoms, for example diethyl thioether and thiophene. It is particularly advantageous to use weakly basic compounds, for example urotopine or azomethines, e.g. the condensation products of the said primary amines, methylamine, ethylamine or aniline with carbonyl compounds, it being particularly advantageous to use the α,β-unsaturated carbonyl compounds which are expected as reaction products. Ammonia may also be used as a nucleophilic substance to particularly good effect.

If a strong base such as trimethylamine is added, it is advisable to neutralize the reaction product immediately. This is not essential where weak bases such as aniline are added. The amount of bases to be used depends on their basicity and on the properties of the alcohols to be dehydrogenated. In general, the nucleophilic substances are used in proportions ranging from 0.1 to 5% and preferably from 0.5 to 1% by weight of the weight of the starting materials.

In many cases, improved yields are achieved by adding basic metal oxides such as BaO, CaO and MgO to the catalyst proper in amounts ranging from 5 to 80% by weight.

The process may be carried out either batchwise or continuously.

The process of the invention constitutes a technological advance in that it provides the possbility of manufacturing α,β-unsaturated carbonyl compounds in a reaction which proceeds at high conversion rates and substantially without side reactions, using a class of starting materials not hitherto known for this purpose.

The α,β-unsaturated carbonyl compounds produced by the process of the invention are organic intermediates of interest in the synthesis of naturally occurring materials such as citral, β-ionone and chrysanthemum acid. For example, the reaction of dimethylacrolein with acetone produces methylheptadienone, which is then partially hydrogenated. The resulting methylheptenone is converted to β-ionone by ethynylation reacting with acetoacetates and cyclization.

In the following examples the parts are by weight unless otherwise stated. Parts by volume relate to parts by weight as liters to kilograms. The catalyst extends over a distance of 50 cm.

EXAMPLE 1

A mixture of 500 parts of 3-buten-1-ol (B.P. 114° C.) and 5 parts of urotropine is passed over 500 parts of a catalyst consisting of 5% Ag on MgO during a period of 6 hours at a partial vacuum of 150 mm. of Hg in an evaporator heated to 380° C. in a vertical tube furnace. The mixture passes from the catalyst to a condensation zone, where 492 parts of a product are collected, the composition of which is determined by gas chromatography. By this method, the yield of 2-buten-1-al (crotonaldehyde) is calculated as being 78% at a conversion of 68%. The B.P. is 102.2° C. and the molecular weight (determined as calculated) is 70.

EXAMPLE 2

Following the procedure described in Example 1, a mixture of 500 parts of 3-penten-1-ol (B.P. 137° C.) and 5 parts of urotropine is passed in the gas phase over 500 parts of a catalyst consisting of 10% Cu on MgO during 6 hours at a partial vacuum of 150 mm. of Hg, the catalyst being heated to 360° C. again in the tube furnace. 480 parts of condensate are collected and analyzed by gas chroamtography, and it is found that the yield of 2-penten-1-al (3-ethyl-acrolein) is 71% at a conversion of 62%. The B.P. is 125° C. and the molecular weight (determined as calculated) is 84.

EXAMPLE 3

500 parts of 2-methyl-1-buten-4-ol (B.P. 130° C.) are passed in the vapor phase over 500 parts of a catalyst consisting of ZnO and heated at 400° C., during 6 hours at 200 mm. of Hg. The gaseous reaction mixture passes to a condensation chamber, were 480 parts of reaction product are collected. The yield is 55% of 3-methyl-2-buten-1-al (3,3-dimethylacrolein) at a conversion of 70%. The B.P. of the product is 132° C. and its molecular weight (determined at calculated) is 84.

EXAMPLE 4

500 parts of 2-methyl-1-butene-4-ol (B.P. 130° C.), in which 5 parts of a 40% methylamine solution in water are dissolved, are passed over 500 parts of a catalyst heated to 250° C. and consisting of 25% Cu on ZnO over 3 hours at 100 mm. of Hg. 485 parts of the product formed are condensed in the condensation zone. Analysis shows that the conversion is 60% and the yield of 3-methyl-2-buten-1-al (3,3-dimethylacrolein) is 87%. The B.P. is 132° C. and the molecular weight( determined as calculated) is 84.

EXAMPLE 5

300 parts of 2-methyl-1-buten-4-al, in which 1.5 parts ot ammonia gas are dissolved, are passed over the catalyst described in Example 4 during 5 hours at 150 mm. of Hg and 300° C. 296 parts of reaction product are obtained. Analysis shows that the conversion is 100% and the yield of 3-methyl-2-buten-1-al (3,3-dimethylacrolein) is 76%. The B.P. is 132° C. and the molecular weight (determined as calculated) is 84.

EXAMPLE 6

500 parts of 1-penten-4-ol (methylallylcarbinol; B.P. 116° C./760 mm.), in which 5 parts of urotropine are dissolved, are passed in the vapor phase over 500 parts of a ZnO catalyst heated to 370° C. during 6 hours at 50 mm. of Hg 483 parts of reaction product are obtained and this is worked up by distillation to give a yield of 2-penten-4-one (methylpropenyl ketone) of 91% of theory at a conversion of 65%. The B.P. is 122° C./760 mm.

EXAMPLE 7

200 parts of 2-methyl-3-buten-1-ol (B.P. 120° C./760 mm.) are passed over 500 parts of a ZnO catalyst heated to 350° C. during 2 hours at 100 mm. of Hg. Gas chromatographic analysis of the 196 parts of reaction product collected in the condensation zone shows a yield of 67% of 2-methyl-2-buten-1-al (tiglaldehyde) at a conversion of 63%. The B.P. is 116° C./760 mm.

EXAMPLE 8

A mixture of 300 parts of 1-hexen-4-ol (ethylallylcarbonol; B.P. 130° C./70 mm.) and 1.5 parts of triphenylphosphine is passed over 500 parts of a catalyst consisting of 25% Cu on ZnO during 3 hours at 100 mm. of Hg. The temperature of the catalyst is 300° C. 294 parts of condensate are collected in the condensation zone. The yield of 2-hexen-4-one (ethylpropenyl ketone) is 83% theory at a conversion of 60%. The B.P. is 138° C./760 mm.

EXAMPLE 9

Following the procedure described in Example 8, a mixture of 300 parts of 3-hexen-1-ol (B.P. 58° C./12 mm.) and 1.5 parts of thiophene are passed over 500 parts of a ZnO catalyst containing 10% of Cu and heated at 350° C., during 3 hours at 100 mm. of Hg. 296 parts of condensate are collected in the condensation zone. The condensate is worked up by distillation to give 2-hexen-1-al (3-propylacrolein); B.P. 148° C./760 mm.) in 85% yield. The conversion is 63%.

EXAMPLE 10

300 parts of 1-hepten-4-ol (propylallylcarbinol; B.P. 150° C./760 mm.), in which 1.5 parts of ammonia gas are dissolved, are passed over a ZnO catalyst heated to 350° C. during 3 hours at 50 mm. of Hg. 295 parts of reaction product are isolated in the condensation zone. Analysis shows a yield of 87% of 2-hepten-4-one (propylpropenyl ketone); B.P. 158° C./760 mm.) at a conversion of 60%.

EXAMPLE 11

300 parts of 1-octen-4-ol (butylallylcarbinol; B.P. 172° C./760 mm.) are passed over 500 parts of ZnO heated to 330° C. for 3 hours at 50 mm. of Hg. Analysis of the resulting 293 parts of reaction product shows a yield of 65% of 2-octen-4-one (butylpropenyl ketone; B.P. 178° C./760 mm.) at a conversion of 56%.

EXAMPLE 12

300 parts of 2-hexyl-3-buten-1-ol (2-ethenyloctan-1-ol; B.P. 94° C./12 mm.) are passed over 500 parts of a ZnO catalyst heated to 300° C. at 20 mm. of Hg. Analysis of the resulting 293 parts of condensate shows a yield of 2-hexylcrotonaldehyde (2-formyl-2-nonene; B.P. 74° C./3 mm.) of 67% of theory at a conversion of 52%.

EXAMPLE 13

300 parts of 3-phenyl-3-buten-1-ol (B.P. 100° C./0.5 mm.) are passed together with 1.5 parts of urotropine, over 500 parts of a ZnO catalyst heated to 300° C. at 20 mm. of Hg. Analysis of the 292 parts of resulting reaction product shows a yield of 3-phenyl-2-buten-1-al ($\beta$-methylcinnamaldehyde; B.P. 130° C./15 mm.) of 87% of theory at a conversion of 55%.

EXAMPLE 14

A mixture of 300 parts of 2-methyl-2-hexen-5-ol (B.P. 60° C./12 mm.) and 1.5 parts of urotropine are passed over 500 parts of a ZnO catalyst heated to 350° C. at 100 mm. of Hg. The 296 parts of reaction product are worked up by distillation to give a yield of 2-methyl-3-hexen-5-one (isobutylidene acetone; B.P. 155° C./760 mm.) of 88% of theory at a conversion of 65%.

We claim:

1. A process for the production of $\alpha,\beta$-unsaturated carbonyl compound of the formula

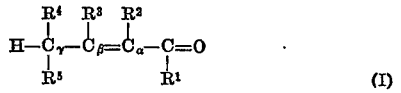

said process comprising contacting a $\beta,\gamma$-unsaturated alcohol of the formula

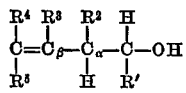

in which $R^1$, $R^2$ and $R^3$ represent hydrogen, alkyl of from 1 to 6 carbon atoms, cycloalkyl of from 4 to 6 ring members or phenyl, and $R^4$ and $R^5$ represented hydrogen or alkyl of from 1 to 3 carbon atoms, with a dehydrogenation catalyst which contains as the active ingredient at least one member selected from the group consisting of ZnO, CdO, MnO, Cu, Ag and Zn at a temperature of from 150° to 600° C. in the vapor phrase at ambient pressure or in a partial vacuum.

2. A process as claimed in claim 1, wherein the symbols $R^1$ to $R^5$ stand for hydrogen, methyl or ethyl.

3. A process as claimed in claim 1, wherein said contacting is carried out, in a partial vacuum of from 10 to 500 mm. of Hg.

4. A process as claimed in claim 1, wherein said contacting is carried out in the presence of a compound having nucleophilic properties and selected from the group consisting of urotropine, methylamine and ammonia.

5. A process as claimed in claim 1, wherein said contacting is carried out in the presence of urotropine.

6. A process as claimed in claim 1, wherein said contacting is carried out in the presence of methylamine.

7. A process as claimed in claim 1, wherein the dehydrogenation catalyst additionally contains a basic metal oxide selected from the group consisting of BaO, CaO and MgO.

8. A process as claimed in claim 1, wherein the $\beta,\gamma$-unsaturated alcohol is 2-methyl-1-buten-4-ol for the production of 3-methyl-2-buten-1-al.

9. A process as claimed in claim 1, wherein the $\beta,\gamma$-unsaturated alcohol is 3-penten-1-ol for the production of 2-penten-1-al.

10. A process as claimed in claim 1, wherein the $\beta,\gamma$-unsaturated alcohol is 3-buten-1-ol for the production of 2-buten-1-al.

11. A process as claimed in claim 1, wherein the $\beta,\gamma$-unsaturated alcohol is 2-methyl-3-buten-1-ol for the production of 2-methyl-2-buten-1-al.

12. A process as claimed in claim 1, wherein the $\beta,\gamma$-unsaturated alcohol is 3-phenyl-3-buten-1-ol for the production of 3-phenyl-2-buten-1-al.

References Cited

Gotin et al.: Chem. Abs., vol. 59 (1963), p. 7336.

BERNARD HELFIN, Primary Examiner

U.S. Cl. X.R.

260—596, 603 R, 598, 586 R, 590, 592

UNITED STATES PATENT OFFICE
CERTIFICATE OF CORRECTION

Patent No. 3,778,477　　　　　　　Dated December 11, 1973

Inventor(s) Herbert Mueller and Norbert Goetz

It is certified that error appears in the above-identified patent and that said Letters Patent are hereby corrected as shown below:

Column 1, ninth line, insert
-- 30　Foreign Application Priority Data
　　　April 29, 1970　Germany . . . . . P 20 20 865.5 --.

Column 2, line 8, "Se" should read -- Fe --.

Column 2, line 60, "nuceleohilic" should read -- nucleophilic --.

Column 2, line 70, "urotopine" should read -- urotropine --.

Column 3, line 20, "possbility" should read -- possibility --.

Column 3, line 60 "chroamtography" should read
-- chromatography --.

Column 3, line 71, "were" should read -- where --.

Column 3, line 75, "at" should read -- as --.

Column 4, line 13, "2-methyl-1-buten-4-al" should read
-- 2-methyl-1-buten-4-ol --.

Column 4, line 13, "ot" should read -- of --.

Signed and sealed this 8th day of October 1974.

(SEAL)
Attest:

McCOY M. GIBSON JR.
Attesting Officer

C. MARSHALL DANN
Commissioner of Patents